(12) United States Patent
Marupaduga et al.

(10) Patent No.: US 10,686,499 B1
(45) Date of Patent: Jun. 16, 2020

(54) SYSTEM AND METHOD FOR ADJUSTING AN ANTENNA SERVING A WIRELESS DEVICE IN A WIRELESS NETWORK

(71) Applicant: Sprint Spectrum LP, Overland Park, KS (US)

(72) Inventors: Sreekar Marupaduga, Overland Park, KS (US); Rajveen Narendran, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/559,765

(22) Filed: Sep. 4, 2019

(51) Int. Cl.
*H04B 7/0452* (2017.01)
*H04B 17/318* (2015.01)
*H04W 4/029* (2018.01)
*H04W 4/02* (2018.01)

(52) U.S. Cl.
CPC ......... *H04B 7/0452* (2013.01); *H04B 17/318* (2015.01); *H04W 4/023* (2013.01); *H04W 4/027* (2013.01); *H04W 4/029* (2018.02)

(58) Field of Classification Search
CPC ... H04B 7/0452; H04B 17/318; H04W 4/023; H04W 4/027
USPC ....................................... 455/562.1
See application file for complete search history.

(56) References Cited

U.S. PATENT DOCUMENTS

| 9,312,929 | B2 * | 4/2016 | Forenza | H04B 7/024 |
| 9,820,190 | B2 * | 11/2017 | Bengtsson | H04W 4/029 |
| 2014/0113676 | A1 * | 4/2014 | Hamalainen | H04W 72/046 455/522 |

* cited by examiner

*Primary Examiner* — Eugene Yun

(57) ABSTRACT

Systems, methods, and processing nodes are configured to adjust antenna systems of a wireless device by receiving mobility information form a wireless device in a wireless network. Responsive to receiving the mobility information, an operating parameter of a multi-element antenna serving the wireless device is adjusted.

20 Claims, 12 Drawing Sheets

SYSTEM AND METHOD FOR ADJUSTING AN ANTENNA SERVING A WIRELESS DEVICE IN A WIRELESS NETWORK

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. Wireless networks may be configured to utilize a single-user multiple-in multiple-out (SU-MIMO) operating mode and/or a multi-user (MU-MIMO) mode. In the SU-MIMO operating mode, multiple data streams are directed towards individual wireless devices. In the MU-MIMO operating mode, the multiple data streams can be directed towards plural wireless devices that are selected to participate in the MU-MIMO operating mode based on the orthogonality of transmission, thereby maximizing resources. In a recent evolution of MIMO technology, known as massive MIMO or large-scale MIMO, an access node may utilize hundreds of antennae to simultaneously transmit each of a plurality of different data streams to a corresponding plurality of wireless devices. Massive MIMO has been identified as one of the promising air interface technologies to address the massive data rate or throughput capacity requirement demanded by wireless devices that operate using new communication protocols including, but not limited to, a Fifth Generation mobile networks or wireless systems (5G) protocol.

However, coupling the high performance capabilities of newer communication protocols with MIMO systems, such as SU-MIMO, MU-MIMO, and massive MIMO using any form of MIMO in a wireless network may create problems. For instance, the addition of a new wireless device that requests access to the wireless network using the newer communication protocol may potentially create a data bottleneck in either the uplink or downlink data path for signals being delivered to one or more of the other wireless devices already in the wireless network using the newer communication protocol. The addition of the wireless device may limit the performance of one or more services to some or all of the wireless devices already currently on the network, particularly if these devices are using services that work best using the newer, higher performance communication protocols. Thus, there is a need to identify and manage wireless devices in a wireless network when a large number of wireless devices are simultaneously utilizing the high performance operating characteristics of new communication protocols with MIMO in a wireless network.

OVERVIEW

Exemplary embodiments described herein include methods, systems, and processing nodes for adjusting antenna systems of a wireless device in a wireless network. An exemplary method includes receiving mobility information from a wireless device in a wireless network and, responsive to the receiving the mobility information, adjusting an operating parameter of a multi-element antenna serving the wireless device.

An exemplary system includes an access node, the access node including one or more multi-element antennas for communicating in a wireless network, a processing node coupled to the access node, and a processor coupled to the processing node. The processing node is configured to perform operations including receiving mobility information from a wireless device in a wireless network and, responsive to receiving the mobility information, adjusting an operating parameter of a multi-element antenna serving the wireless device.

An exemplary processing node includes a processor configured to receive mobility information from a wireless device in a wireless network and, responsive to receiving the mobility information, adjust an operating parameter of a multi-element antenna serving the wireless device.

The above presents a simplified overview of the subject matter in order to provide a basic understanding of some aspects of subject matter embodiments. It is not intended to identify key/critical elements of the embodiments or to delineate the scope of the subject matter. Its sole purpose is to present some concepts of the subject matter in a simplified form as a prelude to the more detailed description that is presented later.

BRIEF DESCRIPTION OF THE DRAWINGS

These and other aspects, features, and advantages of the present disclosure will be described or become apparent from the following detailed description of the preferred embodiments, which is to be read in connection with the accompanying drawings.

Figure 1:
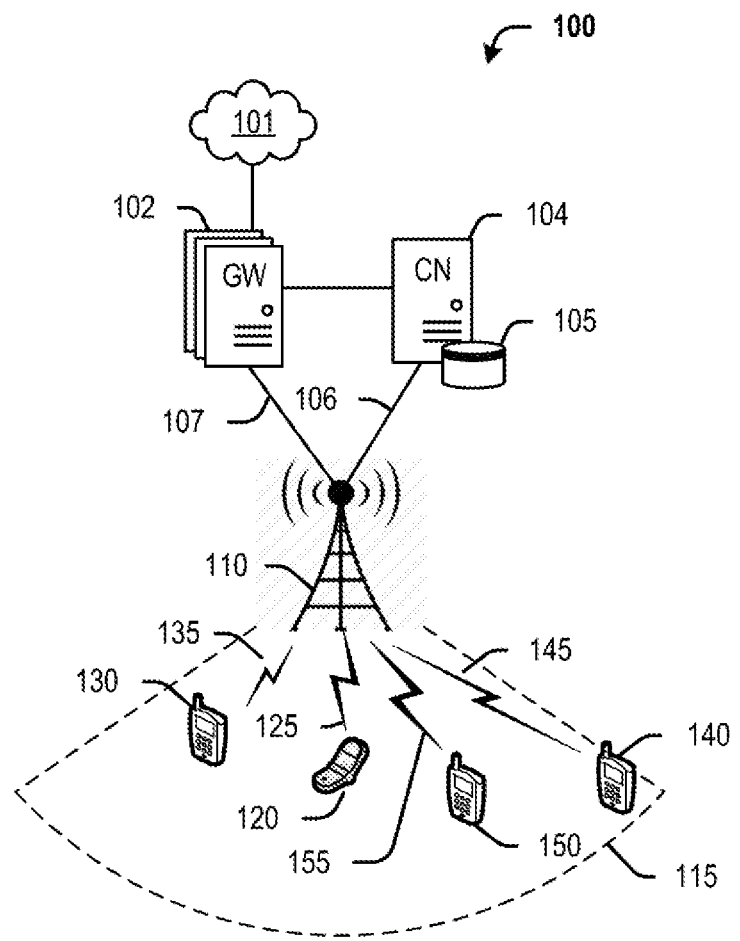
FIG. 1 depicts an exemplary system for managing wireless devices in wireless networks, such as networks configured to utilize MIMO.

It should be understood that the drawing(s) are for purposes of illustrating the concepts of the disclosure and are not necessarily the only possible configuration for illustrating the disclosure.

DETAILED DESCRIPTION

In some of the embodiments disclosed herein, a method or process is described that utilizes a mechanism or process for adjusting antenna systems of a wireless device in a wireless network. The process includes receiving mobility information from a wireless device in a wireless network and processing the mobility information to determine a mobile criteria of the wireless device. The mobile criteria may be based on a change in position of the wireless device. For example, in some embodiments, the mobile criteria may be based on a speed of the wireless device, a change in locality of the wireless device, and/or a distance that the wireless device is traveling. The process may further include comparing the mobile criteria of the wireless device with a predetermined threshold and adjusting an operating parameter of a multi-element antenna, which serves the wireless device, based on the comparison. Thus, in some embodiments, if the mobile criteria of the wireless device is equal to or greater than the predetermined threshold, the wireless device is determined to be a wireless device with a relatively higher mobility and is assigned to a higher order antenna system. Furthermore, in some embodiments, if the mobile criteria of the wireless device is less than the predetermined threshold, the mobile is determined to be a wireless device with a relatively lower mobility and is assigned to a lower order antenna system. As discussed further below, assigning the wireless device to the higher order antenna system or to the lower order antenna system includes altering a number of antenna elements in the multi-element antenna that serves the wireless device.

In some embodiments, the multi-element antenna can be configured to operate in one of several MIMO operating modes in the wireless network including, but not limited to, SU-MIMO, MU-MIMO, and massive MIMO using any form of MIMO. The multi-element antenna includes a number of elements used for communicating in the wireless network using a communication protocol. In some embodiments, the communication protocol may be a 5G protocol or a 4G protocol.

In some embodiments, the total number of elements in the multi-element antenna is 64 elements. An operating parameter of the multi-antenna element may be adjusted by reducing or increasing the number elements used for transmitting a signal, receiving a signal, or both transmitting and receiving a signal within the wireless network. For example, the multi-element antenna may be adjusted to provide a higher order antenna system by increasing the number of elements. Conversely, the multi-element antenna may be adjusted to provide a lower order antenna system by decreasing the number of elements.

In a 64 transmit and/or receive antenna array, the number of operating elements in the higher order antenna system may comprise any number of antenna elements above the lowest available antenna configuration. For example, if the array's lowest operating configuration is 8 transmit and/or receive elements, a higher order antenna system may be at least 16 transmit antenna elements and/or at least 16 receive antenna elements. In other embodiments, if the array's lower operating configuration is 8 transmit and/or receive elements, a higher order antenna system may be at least 32 transmit antenna elements and/or at least 32 receive antenna elements.

Similarly, in a 64 transmit and/or receive antenna array, the number of operating elements in the lower order antenna system may comprise any number of antenna elements below the highest available antenna configuration. For example, if the array's highest operating configuration is 64 transmit and/or receive elements, a lower order antenna system may be 32 or less transmit antenna elements and/or 32 or less receive antenna elements. In other embodiments, if the array's highest operating configuration is 64 transmit and/or receive elements, a lower order antenna system may be 16 or less transmit antenna elements and/or 16 or less receive antenna elements.

The number of operating elements in a first higher order antenna system may be greater than the number of operating elements in a first lower order antenna system and greater than the number of operating elements in a second lower order antenna system. However, it is also contemplated, in some examples, that the number of operating elements in the first higher order antenna system are greater than the number of operating elements in the first lower order antenna system but less than the number of operating elements in the second lower order antenna system. Such may arise depending on the number of wireless devices currently being served in the wireless network.

In some embodiments, the number of operating elements in the higher order antenna system comprise at least 16 transmit and/or receive antenna elements, or at least 32 transmit and/or receive antenna elements, or at least 64 transmit and/or receive antenna elements. The number of operating elements in the lower order antenna system, in some embodiments, comprise 32 or less transmit and/or receive antenna elements, or 16 or less transmit and/or receive antenna elements, or 8 or less transmit and/or receive antenna elements.

The number of elements may be increased and/or decreased by a factor that is a multiple of two. For example, in a 64 transmit and/or receive antenna array, initially the multi-element antenna may include a total of 64 operating elements, and the operating parameters of the multi-element antenna may be adjusted so that the number of operating elements is reduced to 32. Such a reduction in the number of operating elements may occur, for example, to provide a lower order antenna system. In another example, initially the number of operating antenna elements may be reduced from 32 to 16 to provide the lower order antenna system.

In order to provide a higher order antenna system, in a 64 transmit and/or receive antenna array, the number of operating antenna elements may, for example, be increased from 16 to 32. In another example, the number of operating antenna elements may be increased from 32 to 64 to provide the higher order antenna system.

As described above, the number of operating antenna elements may be adjusted so that a predefined number are operational and, therefore, used for transmitting and/or receiving. The remaining antenna elements may not be operational and, therefore, not used for transmitting and/or receiving.

In some embodiments, the adjusting of all or a portion of the multi-element antenna includes reducing the number of elements used for transmitting a communication signal while not reducing the number elements used for receiving a communication signal. For instance, as a result of adjusting the multi-element antenna in a 64 transmit and/or receive antenna array, 32 antenna elements of the original 64 elements remain operational for transmitting communication signals while all 64 elements are still operational for receiving communication signals. Further in some embodiments, the opposite adjustment may be performed, reducing the number of elements used for receiving a communication signal and not reducing the number of elements used for transmitting a communication signal. In either case, the number of elements used for transmitting a communication signal may be different from the number of elements used for receiving a communication signal.

In some embodiments, the multi-element antenna may include a first potion with a first subset of elements and a second portion with a second subset of elements. The first subset of elements may include a different number or the same number of elements from the second subset of elements. For example, in one embodiment, the number of elements in the first subset of elements may be 32 and the number of elements in the second subset of elements may be 32. The first subset of elements may serve a first wireless device and the second subset of elements may serve a second wireless device.

The number of operating elements in the first portion may be adjusted differently from the number of operating elements in the second portion. Therefore, for example, the first portion may serve a first wireless device using a higher order antenna system and the second portion may serve a second wireless device using a lower order antenna system. Both the first and second wireless devices may be within the same wireless network.

The adjusting of all or a portion of the multi-element antenna may be performed only after receiving mobility information of the wireless device. In some embodiments, the mobility information includes mobile criteria of the wireless device. As discussed above, the mobile criteria may be based on a speed of the wireless device, a change in locality of the wireless device, and/or a distance that the wireless device is traveling. The mobile criteria of the wireless device may be compared with a predetermined threshold, and the operating parameters of the multi-element antenna may be adjusted based on the comparison. For example, if the mobile criteria of the wireless device is equal to or greater than the predetermined threshold, the wireless device is determined to be a wireless device with a relatively higher mobility and is assigned to a higher order antenna system. Furthermore, if the mobile criteria of the wireless device is less than the predetermined threshold, the wireless device is determined to be a wireless device with a relatively lower mobility and is assigned to a lower order antenna system.

Every wireless device in the wireless network may be assigned either a higher mobility or a lower mobility wireless device. In other embodiments, only a portion of the total number of wireless devices are assigned a higher mobility and a lower mobility wireless device. Thus, some wireless devices are not designated as being either higher or lower mobility.

In yet still other embodiments, only a portion of the total number of wireless devices are assigned a higher mobility wireless device. In this embodiment, no wireless devices in the wireless network are assigned a lower mobility wireless device. Conversely, in some embodiments, only a portion of the total number of wireless devices are assigned a lower mobility wireless device so that no wireless devices are assigned a higher mobility.

It is also contemplated that is some embodiments, all the wireless devices within the network may be assigned either a higher mobility or a lower mobility.

In some embodiments, the higher mobility wireless device may be a device that is moving at a relatively faster speed than one or more other wireless devices in the wireless network. For example, the higher order mobility device may be traveling on a highway with a speed limit of 60 mph. In this embodiment, for example, the lower order mobility wireless device may be any device that is traveling on a residential road with a speed limit of 25 mph.

In other embodiments, the higher mobility wireless device may be a device that is located near a cell edge for the wireless network and is sending a request for handover to join a different cell in the wireless network serviced by a different access node communication tower, such as a cell adjacent to the cell currently being used by the wireless device.

In yet other embodiments, the higher mobility wireless device may be a wireless device that has traveled a predetermined distance. For example, a wireless device may be assigned a higher mobility once it has traveled over 25 miles, over 50 miles, over 100 miles, etc. The distance traveled by the wireless device may be within the same wireless network or may traverse two or more wireless networks.

A single wireless device may, for example, first be assigned a higher mobility wireless device. One or more events may occur such that the wireless device is then assigned a lower mobility wireless device. Furthermore, the wireless device may then switch back to the higher mobility upon the occurrence of one or more additional events. Therefore, the single wireless device may fluently and smoothly move between the different mobility assignments. In one example, the wireless device may be in a car traveling on a highway and be assigned a higher mobility wireless device. When the car turns off the highway onto a road with a reduced speed limit, the wireless device may be assigned a lower mobility wireless device.

In some embodiments, the wireless device(s) associated with the multi-element antenna array may initially request access to the wireless network. For example, in order for a new wireless device to join the wireless network, the new wireless device goes through an initialization procedure for verification or authentication. In some embodiments, the request for access to the wireless network by the new wireless device may be initially denied when it is determined that the number of wireless devices using the communication protocol of the wireless network equals or meets the threshold number of wireless devices. The request may be initially denied in order to permit any adjustment of the operating parameters of the multi-element antenna to take effect in the deployment and configuration of the wireless network.

In some embodiments, the adjustment to the operating parameters of the multi-element antenna may be performed only when it is determined that the number of wireless devices currently in the wireless network meets a threshold number of wireless devices. In other embodiments, the adjustment to the operating parameters of the multi-element antenna may be for a wireless device that has recently entered the area serviced by the wireless network. Alternatively, the adjustment to the operating parameters of the multi-element antenna may be for a wireless device that has recently been powered on.

In some embodiments described herein, a system is used to perform one or more of the aspects of the present disclosure described by the various embodiments herein. The system includes an access node, the access node including one or more multi-element antennas for communicating in a wireless network using at least one communication protocol. The system further includes a processing node coupled to the access node, the processing node receiving mobility information from a wireless device in the wireless network and, responsive to the receiving the mobility information, providing instructions to adjust an operating parameter of a multi-element antenna serving the mobile device. The access node may include additional electrical elements used in conjunction with general wireless communication technology as well as specific electrical elements necessary for operation in specific types of wireless communication networks. The processing node further may include one or more processors as well as other elements necessary to perform the operations as described above.

In some embodiments described herein, a processing node may be included to perform one or more of the aspects of the disclosure described by the various embodiments herein. The processing node includes one or more processors configured to receive mobility information form a wireless device in a wireless network, and provide instructions for, responsive to the receiving the mobility information, adjusting an operating parameter of a multi-element antenna serving the wireless device. The processing node may include additional elements, including but not limited to, a data storage element, and a memory for storing program instructions. The memory or similar element may provide the program instructions to the one or more processors in order to execute the various mechanisms in the embodiments described herein.

The implementation of one or more of the aspects of the processes, mechanisms, systems, and devices for managing wireless devices in a wireless network as described in the present disclosure may be configured to provide optimal service to each wireless device within a wireless network. The implementation of one or more aspects described herein may assure that users of the wireless devices currently on the wireless network do not perceive a degradation of performance of one or more of the services currently needed by those users of the wireless devices.

These and additional operations are further described with respect to the embodiments depicted in FIGS. 1-11 below.

FIG. 1 depicts an exemplary system 100 for managing wireless devices in wireless networks, including wireless networks configured to utilize MIMO operation (e.g., SU-MIMO, MU-MIMO, and massive MIMO using any form of MIMO). System 100 comprises a communication network 101, gateway node(s) 102, controller node 104, access node 110, wireless devices 120, 130, 140, and a new or additional wireless device 150. Access node 110 is illustrated as deploying a cell or sector 115, with wireless devices 120, 130, 140, 150 being located within sector 115 and accessing network services from a service provider using access node 110. Access node 110 can be any network node configured to provide communication between end-user wireless devices 120, 130, 140, 150 and communication network 101, including standard access nodes and/or short range, low power, small access nodes. For instance, access node 110 may include any standard access node, such as a macrocell access node, base transceiver station, a radio base station, an eNodeB device, an enhanced eNodeB device, a next generation or gigabit NodeB device (gNB) in 5G networks, or the like. In other embodiments, access node 110 can be a small access node including a microcell access node, a picocell access node, a femtocell access node, or the like such as a home NodeB device or a home eNodeB device. It is also noted that access node 110 is illustrated as incorporated as part of a communication tower. However, access node 110 may be incorporated in any number of structures including, but not limited to, a residential or commercial dwelling, a utility pole, a bridge, and the like.

By virtue of comprising a plurality of antennae configured as a multi-element antenna or an antenna array as further described herein, access node 110 may deploy or implement multiple-input-multiple-output (MIMO) modes, such as SU-MIMO or MU-MIMO modes as well as similar massive MIMO modes. In an embodiment, access node 110 may utilize hundreds of antennae to simultaneously transmit each of a plurality of different data streams using the same or different communication protocols, including MIMO data streams 125, 135, 145, 155 to a corresponding plurality of wireless devices (such as wireless devices 120, 130, 140, 155 respectively). Further, it is noted that while three MIMO data streams are disclosed in sector 115, a larger or smaller number of wireless devices and MIMO data streams within sector 115 can be implemented depending on the configuration of access node 110. Moreover, it is noted that while one access node 110 is illustrated in FIG. 1, any number of access nodes can be implemented within system 100.

The plurality of antennae that make up the multi-element antenna or antenna array also transmit and receive data streams, including MIMO data streams, (125, 135, 145, 155) for the corresponding plurality of wireless devices (120, 130, 140, 150). These data streams may include one or more of the services provided over the wireless network including, but not limited, to phone service, internet service, audio streaming service, and video streaming service.

In operation, system 100, using one or more of the elements described herein, receives mobility information, as part of signal 125, 135, 145, and/or 155, from a wireless device. The mobility information includes the mobile criteria of the wireless device. System 100 may continuously receive updated mobility from the wireless device, regardless if the wireless device is currently moving. In other embodiments, system 100 may only continuously receive the updated mobility information if the wireless device is currently moving.

System 100 further determines if the mobile criteria of the wireless device is above, below, or equal to the predetermined threshold and, based on the comparison, adjusts an operating parameter of the multi-element antenna for communicating signals between access node 110 and the wireless devices (e.g., wireless devices 120, 130, 140, 150) in the wireless network. The predetermined threshold may be set and/or updated by system 100 based upon various factors.

In some embodiments, all or a portion of the multi-element antenna in access node 110 may be adjusted by reducing or increasing the number of elements used for transmitting a signal, receiving a signal, or both transmitting and a receiving a signal, as discussed above.

Access node 110 may comprise a processor and associated circuitry to execute or direct the execution of computer-readable instructions to perform operations such as those further described herein. Briefly, access node 110 may retrieve and execute software from storage, which may include a disk drive, a flash drive, memory circuitry, or some other memory device, and which may be local or remotely accessible. The software comprises computer programs, firmware, or some other form of machine-readable instructions, and may include an operating system, utilities, drivers, network interfaces, applications, or some other type of software, including combinations thereof. Further, access node 110 may receive instructions and other input at a user interface. Access node 110 communicates with gateway node 102 and controller node 104 via communication links 106, 107. Access node 110 may communicate with other access nodes (not shown) using a direct link such as an X2 link or similar.

Wireless devices 120, 130, 140, 150 may be any device, system, combination of devices, or other such communication platform capable of communicating wirelessly with access node 110 using one or more frequency bands deployed therefrom. Wireless devices 120, 130, 140, 150, may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

Communication network 101 may be a wired and/or wireless communication network, and may comprise processing nodes, routers, gateways, and physical and/or wireless data links for carrying data among various network elements, including combinations thereof, and may include one or more of a local area network a wide area network, and an internetwork (including the Internet). Communication network 101 may be capable of carrying data including, but not limited to, data to support voice, push-to-talk, broadcast video, and data to support wireless network protocols by wireless devices 120, 130, 140, 150. Wireless network protocols may comprise multimedia broadcast multicast services (MBMS), code division multiple access single carrier radio transmission technology (CDMA 1×RTT), Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX), 4G, LTE Advanced, 5G, 5G New Radio ("5G NR"), or 5G LTE. Wired network protocols that may be utilized by communication network 101 comprise Ethernet, Fast Ethernet, Gigabit Ethernet, Local Talk (such as Carrier Sense Multiple Access with Collision Avoidance (CSMA/CD)), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 may use various communication media, such as air, space, metal, optical fiber, or some other signal propagation path including combinations thereof. Communication links 106, 107 may be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link Gateway node(s) 102 may be any network node(s) configured to interface with other network nodes using various protocols. Gateway node(s) 102 may communicate user data over system 100. Gateway node(s) 102 may be a standalone computing device, computing system, or network component, and may be accessible using a communication interface connection (e.g., a wired or wireless connection), or through an indirect connection such as through a computer network or communication network. For example, gateway node(s) 102 may include a serving gateway (SGW) and/or a public data network gateway (PGW), etc. One of ordinary skill in the art would recognize that gateway node(s) 102 is not limited to any specific technology architecture, such as LTE or 5G NR, and may be used with any network architecture and/or protocol.

Gateway node(s) 102 may comprise a processor and associated circuitry to execute or direct the execution of computer-readable instructions to obtain information. Gateway node(s) 102 may retrieve and execute software from storage, which can include a disk drive, a flash drive, memory circuitry, or some other memory device, and which can be local or remotely accessible. The software may include, among other things, computer programs, firmware, or some other form of machine-readable instructions, and may include an operating system, utilities, drivers, network interfaces, applications, or some other type of software, including combinations thereof. Gateway node(s) 102 may also receive instructions and other input through some type of a user interface (not shown).

Controller node 104 may be any network node configured to communicate information and/or control information over system 100. Controller node 104 may be configured to transmit control information associated with a handover procedure. Controller node 104 may be a standalone computing device, computing system, or network component, and may be accessible using a communication interface connection (e.g., a wired or wireless connection), or through an indirect connection such as through a computer network or communication network. For example, controller node 104 may include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as LTE or 5G NR, and can be used with any network architecture and/or protocol.

Controller node 104 may comprise a processor and associated circuitry to execute or direct the execution of computer-readable instructions to obtain information. Controller node 104 may retrieve and execute software from storage, which may include a disk drive, a flash drive, memory circuitry, or some other memory device, and which may be local or remotely located but accessible from that remote location. In an exemplary embodiment, controller node 104 includes a database 105 for storing information related to capabilities of wireless devices 120, 130, 140, including MIMO capabilities, real-time and/or historic information related to throughput of access node 110, sector 115, etc. This information may be requested by or shared with access node 110 via links 106, 107, or other communication connections, such as X2 connections, and so on. The software comprises computer programs, firmware, or some other form of machine-readable instructions, and may include an operating system, utilities, drivers, network interfaces, applications, or some other type of software, and combinations thereof. Controller node 104 may also receive instructions and other input through some form of a user interface (not shown).

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the processing mechanisms, devices, and equipment described above in system 100 may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 110, controller node 104, and/or network 101. In some embodiments, all or portions of the software programs that control the operations of access node 110, controller node 104, and/or gateway node(s) 102 may be stored external to these devices or stored in the cloud. The software is then downloaded for external storage or the cloud to the devices, as needed, a network, such as communication network 101.

Figure 2:
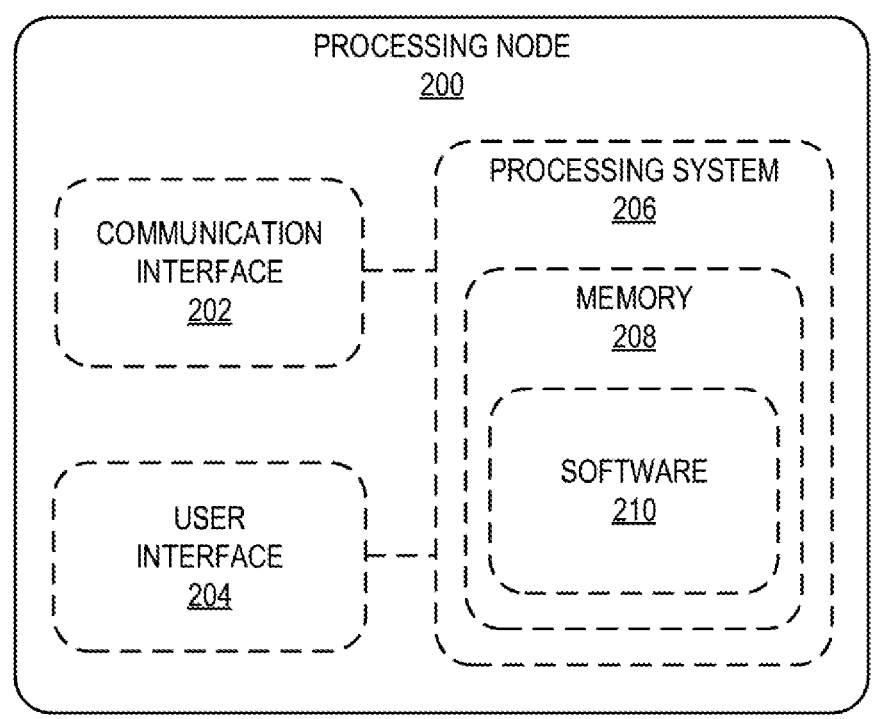
FIG. 2 depicts an exemplary processing node for managing wireless devices in wireless networks, such as networks configured to utilize MIMO.

FIG. 2 depicts an exemplary processing node 200 used in a communication system, such as system 100 depicted in FIG. 1. Processing node 200 comprises a communication interface 202, user interface 204, and processing system 206 in communication with communication interface 202 and user interface 204. Processing node 200 may be included as part of several elements of system 100 depicted in FIG. 1 including, but not limited to, gateway node(s) (102), controller node 104, and access node 110. Processing node 200 may also be included in other elements that have not been depicted as part of system 100 but which may be included as part of the operation of a communication system similar to system 100 depicted in FIG. 1. Processing node 200 may further include other components such as a power management unit, a control interface unit, etc., which have been omitted here for clarity.

In processing node 200, a processing system 206 includes storage 208. Storage 208 may store software 210 which is used in the operation of the processing node 200 as well as any data needed or produced by processing system 206. Storage 208 may include one or more of disk drives, flash drives, data storage circuitry, or some other memory devices. Storage 208 may also include at least one memory element configured as a buffer.

Software 210 may include one or more computer programs, firmware, or some other form of machine-readable instructions, including an operating system, utilities, drivers, network interfaces, applications, or some other type of software. For example, software 210 may include a coherence determination software module. Processing system 206 may include a microprocessor and other circuitry to retrieve and execute software 210 from storage 208.

Communication interface 202 permits processing node 200 to communicate with other network elements, such as the elements included in gateway node(s) 102, controller node 104, and access node 110 described in FIG. 1. User interface 204 permits the configuration and control of the operation of processing node 200 and may further provide information (e.g., visual or aural information) regarding the operations or status of processing node 200 or other elements and devices in communication with processing node 200.

In operation and among other performed functions, processing node 200 uses processing system 206 to manage wireless devices (e.g., wireless devices 120, 130, 140, 150 in FIG. 1) as part of a communication system deployed in a wireless network. Processing node 200 may receive mobility information from a wireless device, and processing node 200 may further determine the mobility of the wireless device based upon the received mobility information. Processing node 200 may also perform any other measurements or calculations that are necessary for the determination and as have been described earlier in FIG. 1. Processing node 200 may also store any results, intermediate or otherwise, from the calculations or determinations performed in storage 208. Processing node 200 may further provide instructions, through communication interface 202, for adjusting an operating parameter of an antenna array that is part of the access node for communicating signals in the wireless network. The instruction may include, among other things, commands to increase and/or reduce the number of operating antenna elements used for transmission and/or reception of communication signals in the multi-element antenna. Some or all the instructions for executing these and other aspects of the operation of processing node 200 may be stored and retrieved from software 210. It is important to note many of the same variations of embodiments described earlier in FIG. 1 may similarly be applicable to the operation of processing node 200.

Figure 3:
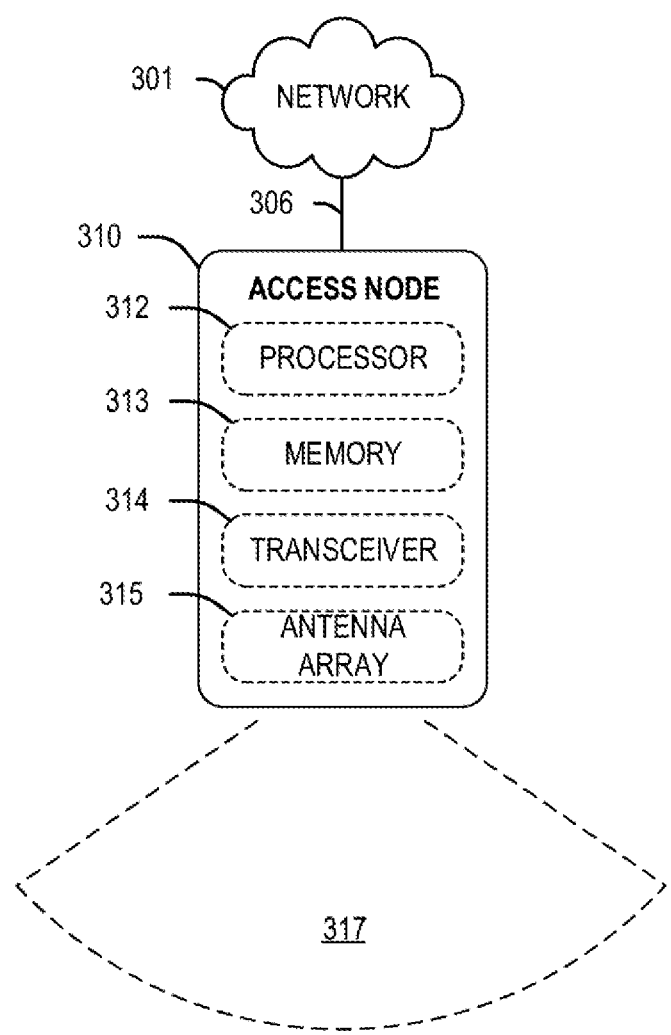
FIG. 3 depicts an exemplary access node for managing wireless devices in wireless networks, such as networks configured to utilize MIMO.

FIG. 3 depicts an exemplary access node 310 used in a communication system, such as system 100 depicted in FIG. 1. Access node 310 is configured as an access point for providing network services between network 301, through components such as gateway nodes and controllers (not shown), to end-user wireless devices, such as wireless devices 120, 130, 140, 150 described in FIG. 1, in a cell or sector 317. Access node 310 is illustrated as comprising a processor 312 for executing the logical modules, a memory 313 for storing logical modules that perform operations described herein, and a transceiver 314 for transmitting and receiving signals via antenna array 315. For example, transceiver 314 may receive the mobility information from the wireless devices. Further, access node 310 is communicatively coupled to network 301 via communication interface 306, which may be any wired or wireless link as described above.

In general, access node 310 operates in a manner similar to that described for access node 110 described in FIG. 1 including any of the various aspects of operation in any of the embodiments. More specifically, access node 310 uses a combination of processor 312, memory 313, transceiver 314, and antenna array 315 to control and manage various aspects of communicating with a set of wireless devices (e.g., wireless devices 120, 130, 140, 150 in FIG. 1) in a wireless communication system, such as system 100 described in FIG. 1. In an embodiment, memory 313 comprises one or more logical modules or program modules that are executed by processor 312 to enable access node 310 to receive a signal or instructions (e.g., at processor 312 through network 301) from a processing node or other processing device located external to access node 300 to adjust an operating parameter of some aspect of the operation of one or more elements of antenna array 315. Access node 310 adjusts the operating parameter for all or a portion of antenna array 315 through a control signal, in some cases using transceiver 314 and/or provided by processor 312. The operating parameter may include, among other things, enabling or disabling one or more antenna elements in antenna array 315 with the wireless devices located in sector 317 as part of the wireless network.

In some embodiments, access node 310 may be part of a system for managing wireless devices in a wireless network configured to utilize a MIMO operating mode. In these embodiments, access node 310 may also include a processing node (e.g., processing node 200 described in FIG. 2) which is configured to perform operations including receiving mobility information from a wireless device operating in the wireless network and comparing mobility criteria of the mobility information to a predetermined threshold. An operating parameter for some portion of antenna array 315 may be adjusted, in some cases using control information from transceiver 314, based on the comparison.

Figure 4:
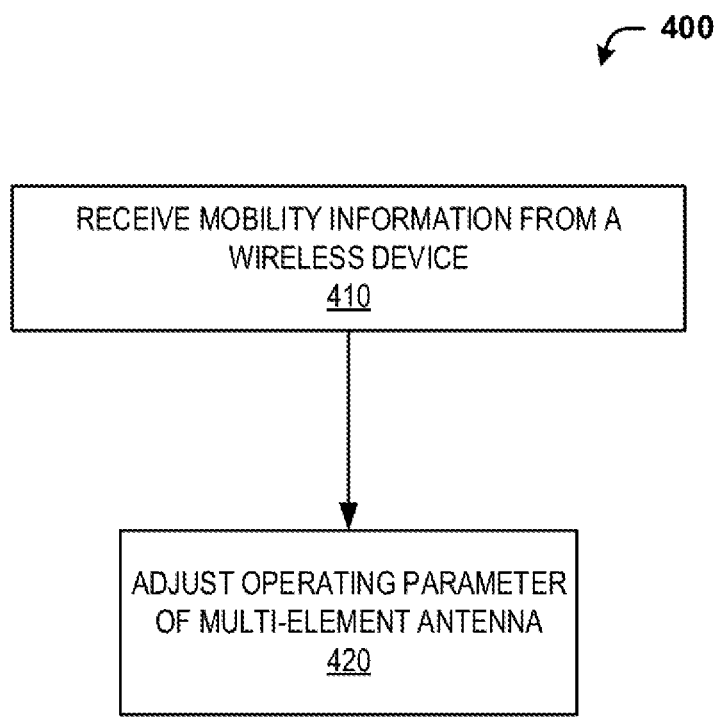
FIG. 4 depicts an exemplary process for managing wireless devices in wireless networks, such as networks configured to utilize MIMO.

FIG. 4 depicts an exemplary process 400 for adjusting antenna systems of one or more wireless devices in a wireless network. Process 400 may be particularly suited for adjusting antenna systems of wireless devices in wireless networks employing MIMO operation, such as SU-MIMO, MU-MIMO, and massive MIMO using any form of MIMO. Process 400 is primarily described with respect to an access node, such as access node 310 described in FIG. 3. The access node may also include a processing node, such as processing node 200 described in FIG. 2. Process 400 may also be performed by an access node as configured and depicted in FIG. 1 (i.e., access node 110) or performed by a combination of elements depicted in FIG. 1, such as access node 110 and controller node 104. In other embodiments, the method can be implemented with any suitable network element. Although process 400 depicts steps performed in a particular order for purposes of illustration and discussion, the operations discussed herein are not limited to any particular order or arrangement. One skilled in the art, using the disclosures provided herein, will also appreciate that one or more of the steps of process 400 may be omitted, rearranged, combined, and/or adapted in various ways. At step 410, mobility information is received from a wireless device in a wireless network, such as the wireless network deployed in sector 317. The mobility information may be received in real-time without a delay. Additionally, as discussed above, the mobility information may be received continuously regardless if the wireless device is moving. In other embodiments, the mobility information may only be received continuously if the wireless device is moving. In some embodiments, the mobility information may be received, at step 410, from a new wireless device that has recently entered the area serviced by the wireless network, from a wireless device that has recently been powered on within the area, or from a wireless device that has already been active and within the area for a time period.

The mobility information may include at least positional, location, and/or speed data of the wireless device. At step 420, responsive to receiving the mobility information, an operating parameter of the multi-element antenna serving the mobile device is adjusted. As discussed above, the operating parameter of the multi-element antenna may be adjusted to provide either a lower or higher order antenna system. The system continuously monitors and receives mobility information from the wireless device. Therefore, after step 420, the process starts again at step 410.

Figure 5A:
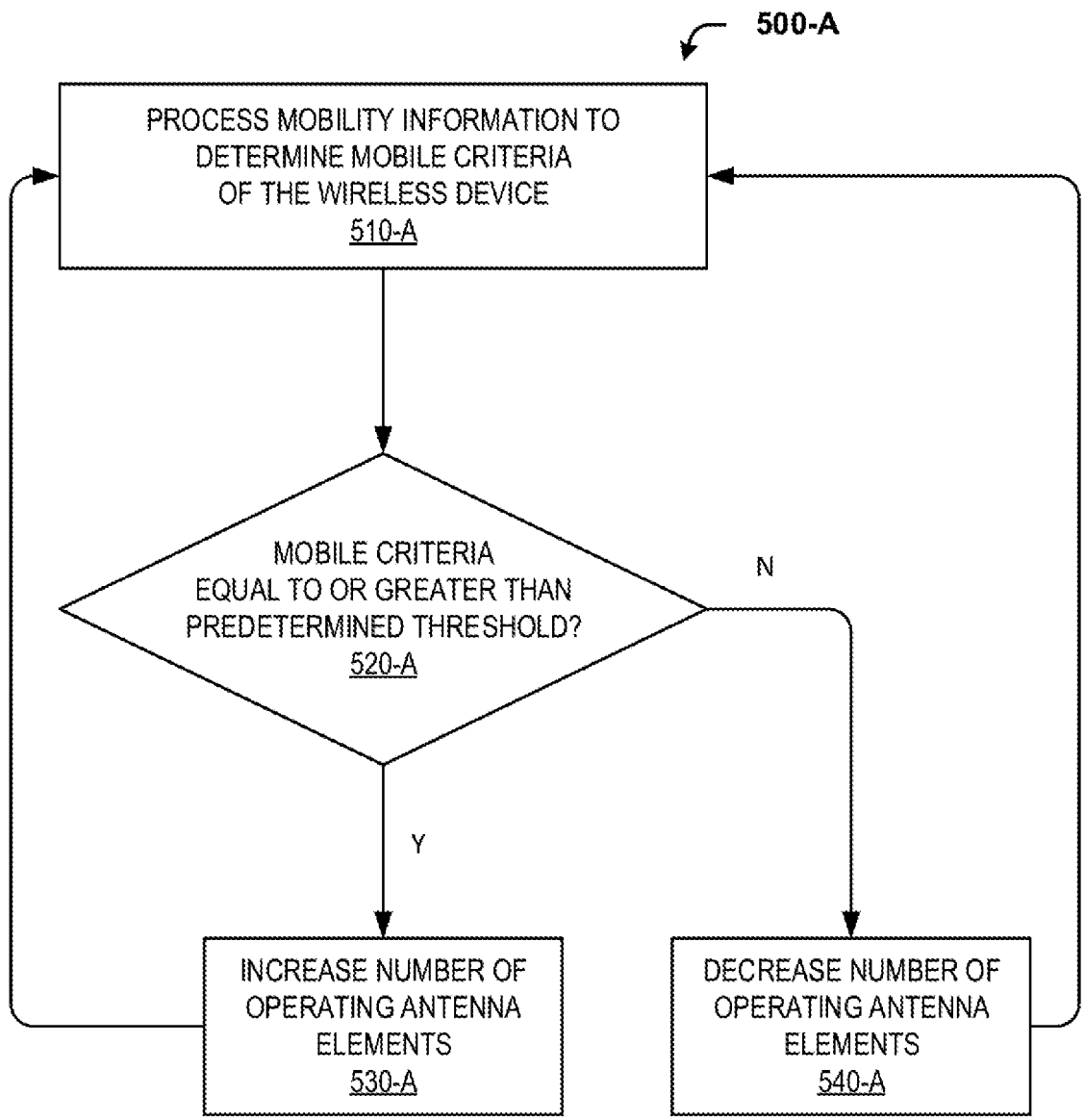
FIG. 5A depicts another exemplary process for managing wireless devices in wireless networks, such as networks configured to utilize MIMO.
Figure 5B:
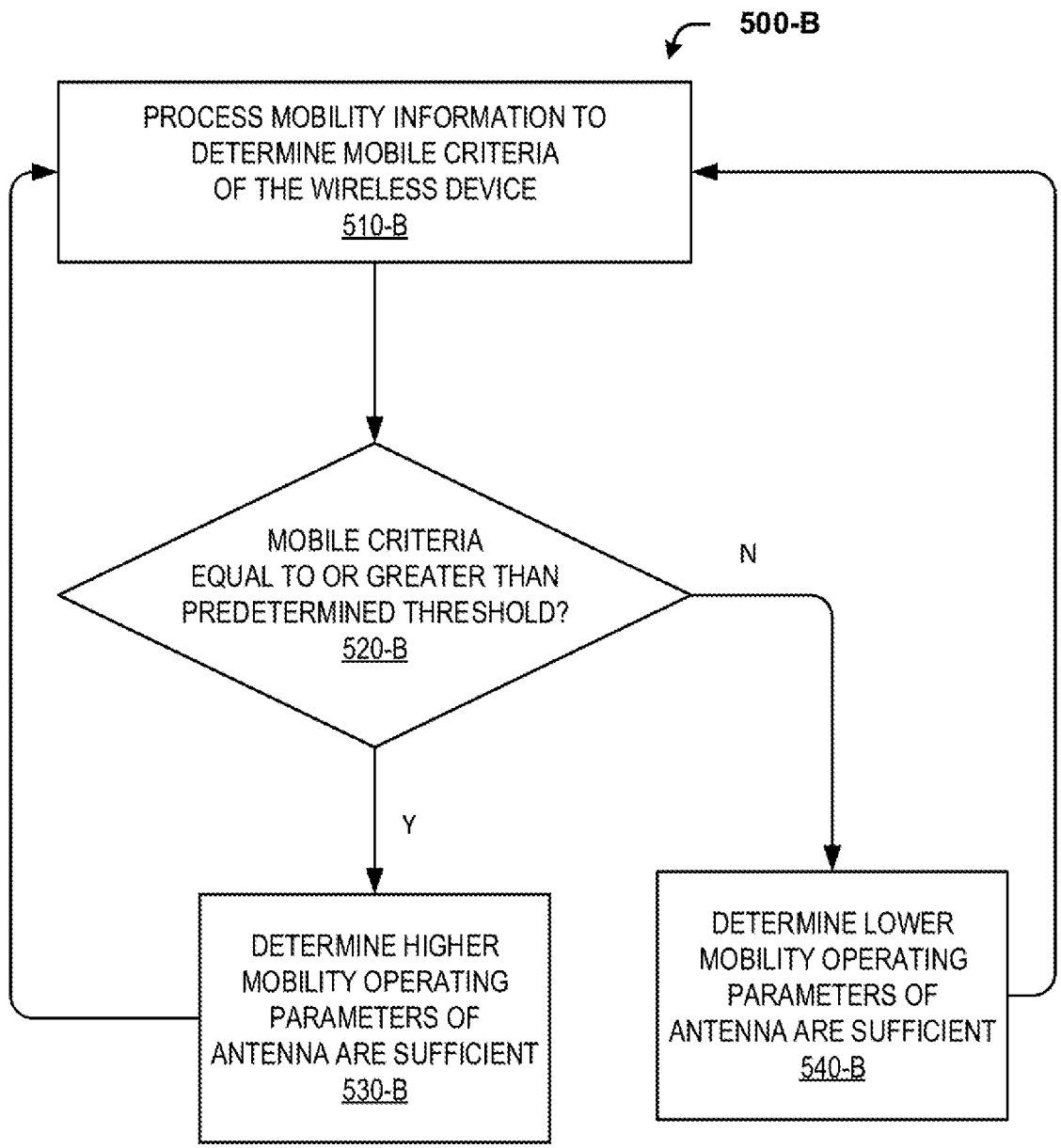
FIG. 5B depicts another exemplary process for managing wireless devices in wireless networks, such as networks configured to utilize MIMO.

FIGS. 5A and 5B depict exemplary processes of adjusting the operating parameter of the multi-element antenna (step 420 of FIG. 4). As discussed further below, FIG. 5A depicts a process 500-A of adjusting the operating parameters to either the lower order or higher order antenna system. FIG. 5B depicts a process 500-B in which the operating parameters of the multi-element antenna are not adjusted to provide either the lower order or higher order antenna system. Although processes 500-A and 500-B depict steps performed in a particular order for purposes of illustration and discussion, the operations discussed herein are not limited to any particular order or arrangement. One skilled in the art, using the disclosures provided herein, will also appreciate that one or more of the steps of processes 500-A and/or 500-B may be omitted, rearranged, combined, and/or adapted in various ways At step 510-A of process 500-A, access node 310 may process the received mobility information to determine mobile criteria of the wireless device. As discussed further below, the operating parameters of the multi-element antenna are adjusted based upon the determined mobile criteria. In some embodiments, the mobile criteria may be based on a change in position of the wireless device. For example, the mobile criteria may be based on the current speed at which the wireless device is currently traveling, or an average speed of the wireless device over a predetermined time period. In other embodiments, the mobile criteria may be based on the distance traveled by the wireless over a predetermined time period. In yet other embodiments, the mobile criteria may be based on a handover request by the wireless device.

At step 520-A, a comparison is made between the mobile criteria of the wireless device and a predetermined threshold. The predetermined threshold may be set in advance and may apply to each wireless device within the wireless network. Alternatively, the predetermined threshold may be unique to each wireless device. In some embodiments, the predetermined threshold may be updated and/or changed periodically.

Based on the comparison, a determination is made as to whether the wireless device is a higher mobility or a lower mobility wireless device. As discussed above, higher mobility wireless devices, for example, have a relatively greater speed, are currently traveling for relatively longer distances, or are requesting a handover procedure. Furthermore, lower mobility wireless device, for example, have a relatively lower speed, are currently traveling for relatively shorter distances, or are not requesting a handover procedure.

Based on the comparison, if the mobile criteria is equal to or greater than the predetermined threshold (step 520-A Y), then a determination is made that the wireless device is a higher mobility wireless device. The operating parameters of the multi-element antenna are then adjusted, as shown by step 530-A, by increasing a number of antenna elements that are operating for at least one of transmitting and receiving signals.

However, based on the comparison, if the mobile criteria is less than the predetermined threshold (step 520-A N), then a determination is made that the wireless device is a lower mobility wireless device. The operating parameters of the multi-element antenna are then adjusted, as shown by step 540-A, by decreasing a number of antenna elements that are operating for at least one of transmitting and receiving signals.

After completion of adjusting the operating parameters of the antenna (e.g., antenna array 315), at step 530-A or at step 540-A, and after any changes have taken place with operation of the wireless devices in the wireless network as a result of the adjustment, process 500-A returns to step 510-A where additional mobility information is received from the wireless device.

In some embodiments, as shown in the exemplary process 500-B of FIG. 5B, the operating parameters of the antenna may already be sufficient after the comparison of the mobile criteria with the predetermined threshold. Thus, an adjustment of the operating parameters may not be required in order to have a sufficient number of operating antenna elements. Similar to the process discussed above in reference to FIG. 5A, in the process 500-B of FIG. 5B, a comparison is made between the mobile criteria of the wireless device and a predetermined threshold (step 520-B). Based on the comparison, a determination may be made that the mobile criteria is equal to or greater than the predetermined threshold (step 520-B Y). Therefore, the wireless device is assigned a higher order mobility. In the process of FIG. 5B, the multi-element antenna was already adjusted for the higher order mobility. Therefore, at step 530-B, a determination is made that the operating parameters of the antenna are sufficient. The operating parameters of the multi-element antenna are not adjusted at this time.

Similarly, in the process of FIG. 5B, if a determination is made that the mobile criteria is less than the predetermined threshold (step 520-B N), the wireless device is assigned to a lower order mobility. In the process of FIG. 5B, the multi-element antenna was already adjusted for the lower order mobility. Therefore, at step 540-B, a determination is made that the operating parameters of the antenna are sufficient. The operating parameters of the multi-element antenna are not adjusted at this time.

Figure 6:
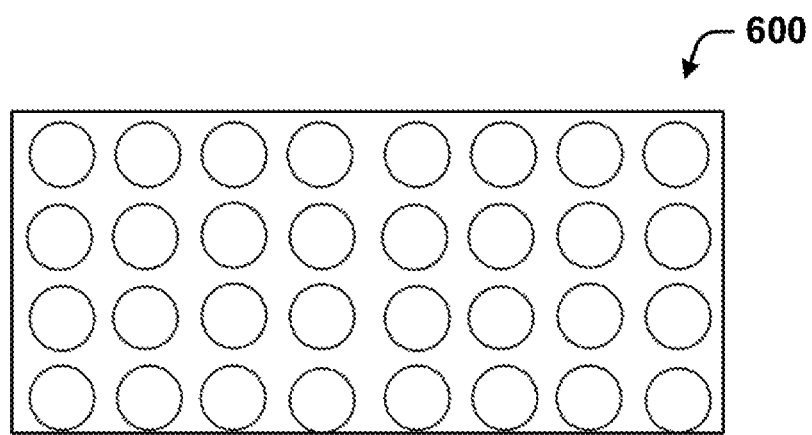
FIG. 6 depicts an exemplary antenna in a signal communication configuration as part of managing wireless devices in wireless networks, such as networks configured to utilize MIMO.

FIG. 6 depicts an exemplary antenna 600 in a signal communication configuration as part of managing signal transmission characteristics in wireless networks. Antenna 600 may be configured as an antenna array, such as antenna array 315, configured to utilize MIMO operation in conjunction with access node 310 in FIG. 3. Antenna 600 may also be configured as an antenna array in conjunction with access node 110 in system 100 depicted in FIG. 1 or configured as an antenna array to use with any communication system employing MIMO communication techniques, particularly those associated SU-MIMO, MU-MIMO, and massive MIMO using any form of MIMO communication to a plurality of wireless devices. Antenna 600 may be considered as operating in an initial operating condition prior to any adjustment using the elements described for process 500-A described in FIG. 5A or for process 500-B described in FIG. 5B.

Antenna 600 illustrates an array of 32 individual antenna elements used for both transmission and reception of signals in conjunction with a transceiver element, such as transceiver 314, as part of an access node, such as access node 310.

Figure 7:
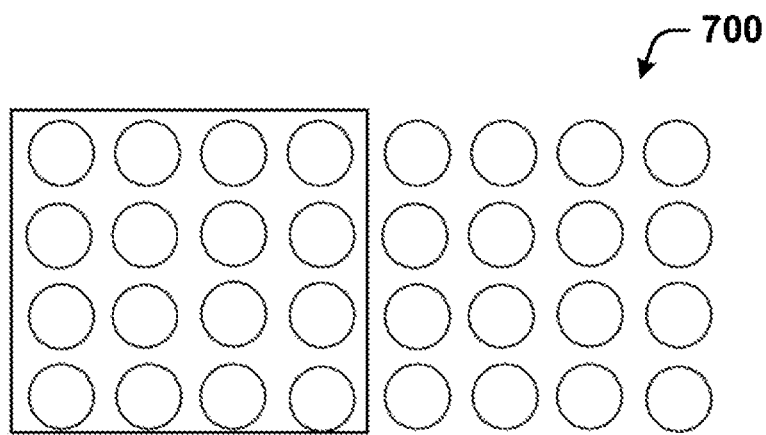
FIG. 7 depicts an exemplary antenna in another signal communication configuration as part of managing wireless devices in wireless networks, such as networks configured to utilize MIMO.

In one example, after a determination has been made that the mobile criteria of the wireless device is less than the predetermined threshold, access node 310 may adjust the operating parameters of antenna 600. Therefore, as shown in FIG. 7, the number of operating antenna elements may be reduced for at least one of transmitting and receiving signals. In the example of FIG. 7, the number of operating antenna elements was reduced from 32 to 16 elements. The number of operating antenna elements may, for example, be adjusted by a factor of two. The reduction in elements may be performed by one or more of several different mechanisms including enabling or disabling elements in antenna 700 under control of a transceiver or as part of an access node.

By configuring antenna 700 to operate with 16 elements instead of 32 elements, the antenna gain of antenna 700 may be reduced or lowered by approximately three decibels (dB). The lower antenna gain may also reduce or lower the effective incident radiated power (EIRP) of antenna as well as increase or widen the effective transmission beamwidth of antenna, lowering the signal reception sensitivity of antenna. As a result, the effective communication range of any communication signals transmitted or received using antenna 700 will be reduced or lowered by approximately one half of the original communication range. The lowered communication range may force one or more wireless devices, particularly those wireless devices located near a cell edge of a cell or sector serviced by antenna, to cease operation in the wireless network.

The number of operating antenna elements in the example of FIG. 7 was reduced because it was determined that the wireless device was a lower mobility wireless device (its mobile criteria was less than the predetermined threshold). Because access node 310 continuously receives mobility information from the wireless device, the wireless device may change back from the lower mobility to the higher mobility. Thus, access node 310 may make a new determination that the mobile criteria of the wireless device is equal to or greater than the predetermined threshold. Access node 310 may then adjust the number of operating antenna elements and, for example, increase the number from 16 to 32. Thus, the multi-element antenna serving the wireless device may change from the configuration of FIG. 7 to the configuration of FIG. 6.

It is also contemplated that the multi-element antenna may serve two or more wireless devices simultaneously, such that a first wireless device is a higher mobility device and a second wireless device is a lower mobility. For example, the process steps of FIGS. 4-5B may be performed simultaneously for each of the first and second wireless devices. It is also within the scope of the disclosure that the first and second wireless devices are both higher or lower mobility wireless devices at the same time.

Figure 8:
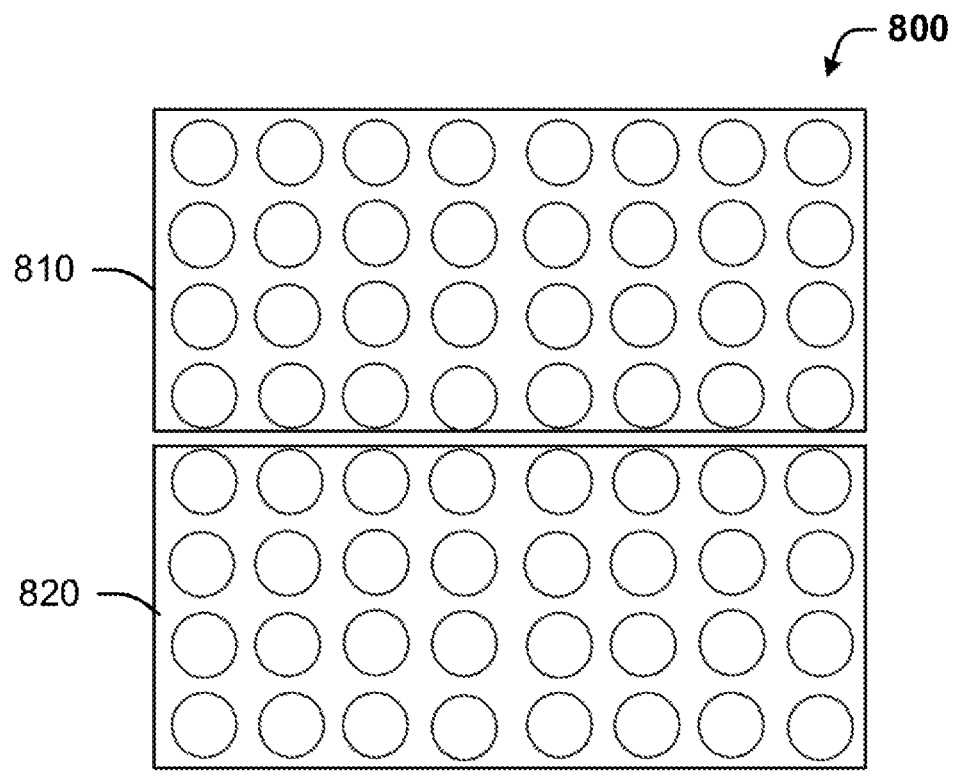
FIG. 8 depicts an exemplary antenna in another signal communication configuration as part of managing wireless devices in wireless networks, such as networks configured to utilize MIMO.

FIG. 8 depicts an exemplary antenna 800 arranged into two subgroups of antenna elements, subgroup 810 and subgroup 820, such that each subgroup is formed of arrays of 32 elements. Each of subgroups 810 and subgroup 820 are used in the same communication system and can each transmit and receive using the same or different communication protocol. In one embodiment, subgroup 810 communicates using a 5G protocol and subgroup 820 communicates using a 4G protocol.

Subgroups 810, 820 each include an array of 32 individual antenna elements used for both transmission and reception of signals in conjunction with a transceiver element, such as transceiver 314, as part of an access node, such as access node 310. However, it is also contemplated that subgroups 810, 820 may each have more or less individual antenna elements. In some embodiments, subgroup 810 has a different number of antenna elements from subgroup 820.

Figure 9:
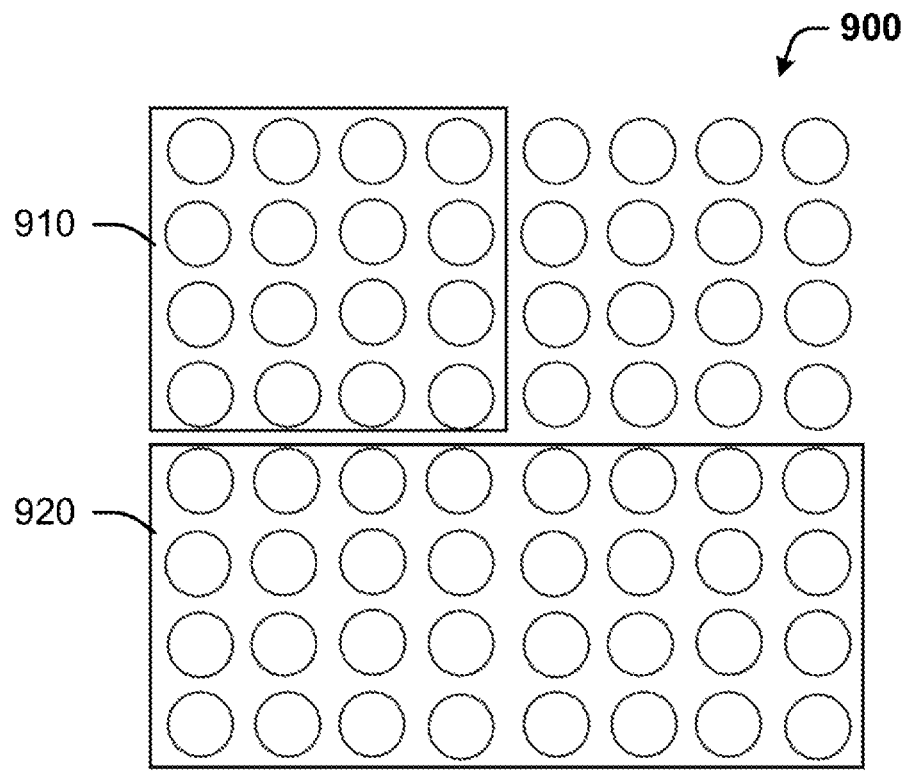
FIG. 9 depicts an exemplary antenna in another signal communication configuration as part of managing wireless devices in wireless networks, such as networks configured to utilize MIMO.

Subgroups 810 may serve a first wireless device in the wireless network and subgroup 820 may serve a second wireless device in the wireless network. In one example, after a determination has been made that the mobile criteria of the first wireless device is less than the predetermined threshold, access node 310 may adjust the operating parameters of subgroup 810. Therefore, as shown in FIG. 9, the number of operating antenna elements in subgroup 810 may be reduced for at least one of transmitting and receiving signals. In the example of FIG. 9, the number of operating antenna elements in subgroup 910 was reduced from 32 to 16 elements. The number of operating antenna elements may, for example, be adjusted by a factor of two.

As also shown in FIG. 9, the number of operating elements in subgroup 910 may be adjusted independently from the number of operating elements in subgroup 920. Therefore, for example, a determination may also be made that the mobile criteria of the second wireless device is equal to or greater than the predetermined threshold. Thus, access node 310 may determine that the second wireless device is a higher mobility device and may maintain all 32 elements as operating elements.

It is important to note that subgroup 810 of antenna 800 may be configured to operate, after the adjustment as described above, using more or less elements than the 16 elements as described. In some embodiments, the reduction in number of elements may be any factor of two of the original number of elements in the subgroup. Further, subgroup 810 may be adjusted iteratively as part of a series of configurations, either reducing or increasing the number of elements in a subgroup for use with the first communication protocol.

Figure 10:
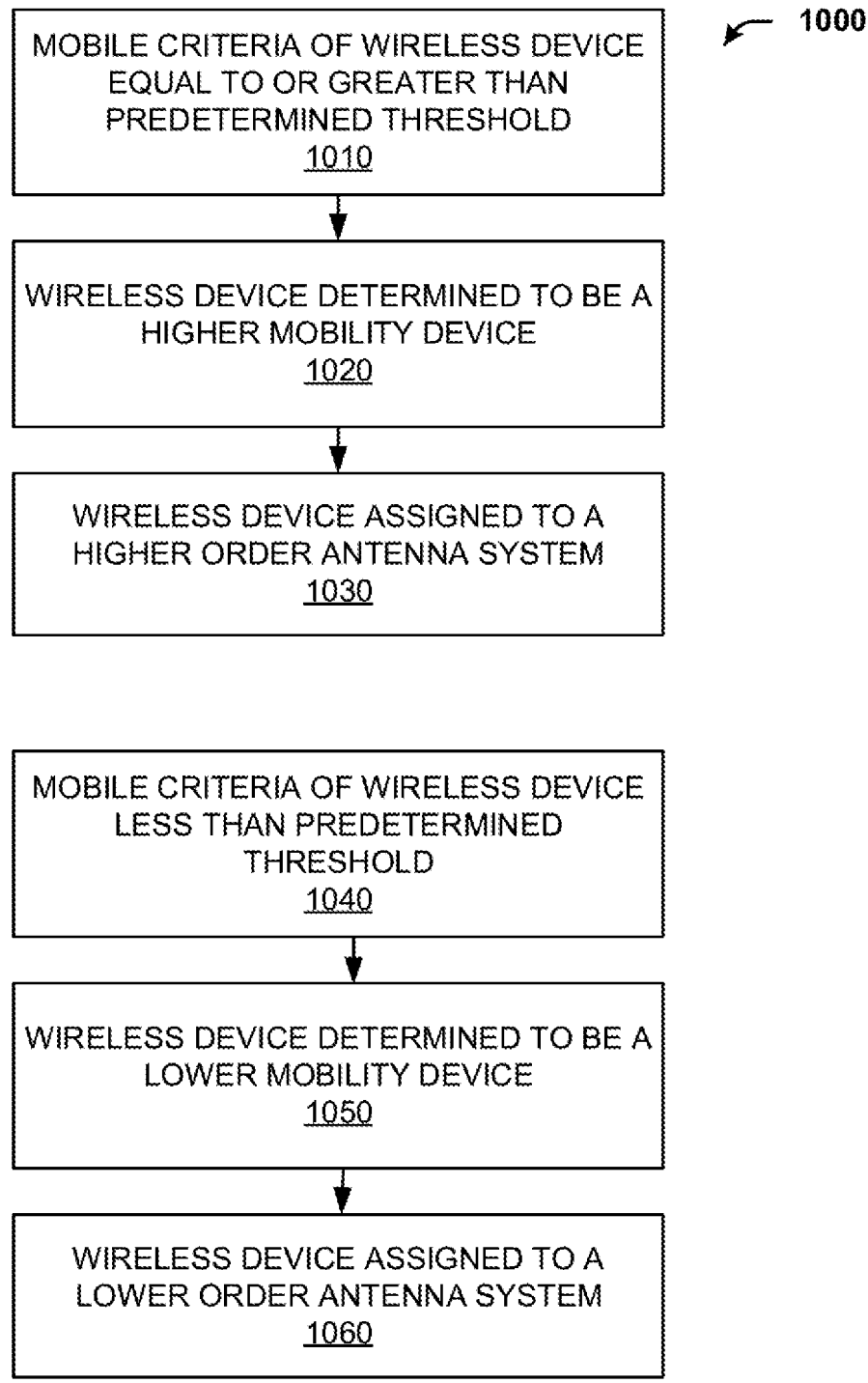
FIG. 10 depicts another exemplary process for managing wireless devices in wireless networks, such as networks configured to utilize MIMO.

FIG. 10 depicts exemplary processes 1000 for assigning a wireless device to a higher or lower order antenna system. As also discussed above, in a first embodiment, the mobile criteria of the wireless device is determined to be equal to or greater than the predetermined threshold, step 1010. Then, at step 1020, the wireless device is determined to be a higher mobility device. Such a higher mobility device is then assigned to a higher order antenna system, step 1030. As discussed above, one or more parameters of the multi-element antenna may be adjusted to provide the higher order antenna system.

In a second embodiment with reference to FIG. 10, the mobile criteria of the wireless device is determined to be less than the predetermined threshold, step 1040. Then, at step 1050, the wireless device is determined to be a lower mobility device. Such a lower mobility device is then assigned to a lower order antenna system, step 1060. As discussed above, one or more parameters of the multi-element antenna may be adjusted to provide the lower order antenna system.

Figure 11:
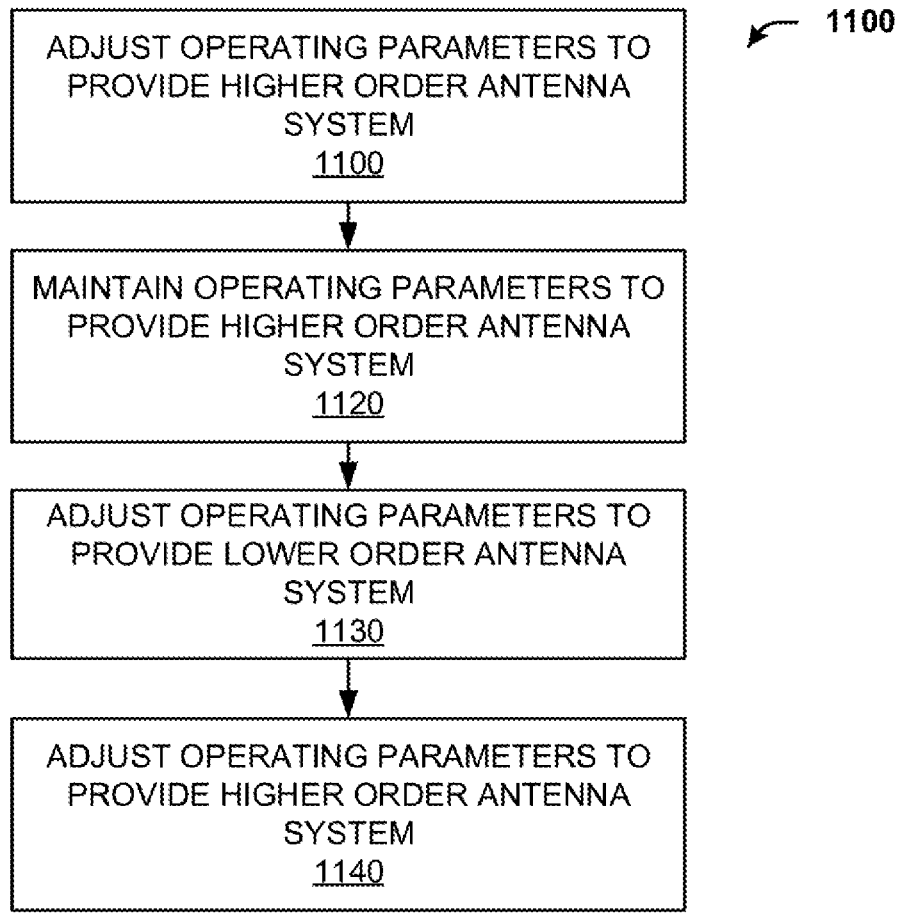
FIG. 11 depicts another exemplary process for managing wireless devices in wireless networks, such as networks configured to utilize MIMO.

FIG. 11 depicts an exemplary process 1100 of a single wireless device fluently and smoothly moving between the different mobility assignments. For example, as shown in step 1100 of FIG. 11, the wireless device is first assigned to a higher order antenna system and the operating parameters of the multi-element antenna are adjusted accordingly. Because the mobility information of the mobile device is constantly being received, system 100 may receive new mobility information at step 1120. Therefore, at step 1120, system 100 may make a new comparison between the mobile criteria of the wireless device and the predetermined threshold. At step 1120, for example, system 100 may determine that the wireless device should remain assigned to a higher order antenna system and the operating parameters of the multi-element antenna are sufficient. Therefore, the operating parameters of the multi-element antenna do not need to be adjusted.

At step 1130, system 100 may receive new mobility information from the wireless device and may determine that the wireless device should now be assigned a lower order antenna system. System 100 may further determine that the operating parameters of the multi-element are not sufficient and that the operating parameters should be adjusted to provide the lower order antenna system.

At step 1140, system 100 may now determine that the same wireless device should be assigned to a higher order antenna system and may again adjust the operating parameters accordingly.

FIG. 11 provides an exemplary example of a wireless device traveling in a car that may initially be traveling on a highway at 60 mph (steps 1110 and 1120). Then, at step 1130, the car may turn off the highway and onto a road with a reduced speed limit of 30 mph. Finally, at step 1140, the car may turn onto a road with a higher speed limit of 45 mph.

While some of the embodiments have been described in the general context of program modules or nodes that execute in conjunction with an application program that runs on an operating system on a computing device, those skilled in the art will recognize that aspects may also be implemented in combination with other program modules or nodes.

Generally, program modules or nodes include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communication network. In a distributed computing environment, program modules may be located in both local and remote memory storage devices.

Some of the embodiments described above may further be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable media.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid-state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

Although embodiments which incorporate the teachings of the present disclosure have been shown and described in detail herein, those skilled in the art can readily devise many other varied embodiments that still incorporate these teachings. Having described preferred embodiments of systems and methods for managing wireless devices in a wireless network (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

What is claimed is:

1. A method for adjusting a multi-element antenna serving a wireless device, the method comprising:
   receiving mobility information from a wireless device in a wireless network, the wireless device served by an access node comprising the multi-element antenna, the multi-element antenna comprising a plurality of elements configured to establish a lower order antenna system or a higher order antenna system, and the mobility information relating to a translational movement of the wireless device;
   processing the mobility information to classify the wireless device as a lower order mobility device or a higher order mobility wireless device; and
   responsive to receiving the mobility information, adjusting the multi-element antenna to the lower order antenna system for the lower order mobility device or the higher order antenna system for the higher order mobility wireless device.

2. The method of claim 1, wherein the multi-element antenna is configured to provide a multiple-input multiple-output (MIMO) operating mode in the wireless network.

3. The method of claim 1, wherein the multi-element antenna is adjusted to the higher order antenna system and the wireless device is classified as the higher order wireless device.

4. The method of claim 3, wherein adjusting the multi-element antenna to the higher order antenna system comprises increasing a number of antenna elements that are operating for at least one of transmitting and receiving signals.

5. The method of claim 3, wherein the higher order antenna system comprises at least 16 transmit antenna elements and at least 16 receive antenna elements.

6. The method of claim 1, wherein the multi-element antenna is adjusted to the lower order antenna system and the wireless device is classified as the lower order wireless device.

7. The method of claim 6, wherein adjusting the multi-element antenna to the lower order antenna system comprises decreasing a number of antenna elements that are operating for at least one of transmitting and receiving signals.

8. The method of claim 6, wherein the lower order antenna system comprises 8 or less transmit antenna elements and 8 or less receive antenna elements.

9. The method of claim 1, further comprising:
   processing the mobility information to determine a mobile criteria of the wireless device, the mobile criteria being based on a change in position of the wireless device;
   comparing the mobile criteria with a predetermined threshold; and
   adjusting the multi-element antenna to the higher order antenna system by increasing a number of operating antenna elements if the mobile criteria is equal to or greater than the predetermined threshold.

10. The method of claim 1, wherein the translational movement comprises one or more of a translational speed of the wireless device, a change in location of the wireless device, and a distance traveled by the wireless device.

11. A system for adjusting a multi-element antenna systems serving a wireless device in a wireless network, the system comprising:
    an access node, the access node comprising the multi-element antenna comprising a plurality of elements configured to establish a lower order antenna system or a higher order antenna system;
    a processing node coupled to the access node; and
    a processor coupled to the processing node, the processor being configured to perform operations comprising:
      receiving mobility information from the wireless device in the wireless network, the mobility information relating to a translational movement of the wireless device;
      processing the mobility information to classify the wireless device as a lower order mobility device or a higher order mobility wireless device; and
      responsive to receiving the mobility information, adjusting the multi-element antenna to the lower order antenna system for the lower order mobility device or the higher order antenna system for the higher order mobility wireless device.

12. The system of claim 11, wherein the multi-element antenna is configured to provide a multiple-input multiple-output (MIMO) operating mode in the wireless network.

13. The system of claim 11, wherein the multi-element antenna is adjusted to the higher order antenna system and the wireless device is classified as the higher order wireless device.

14. The system of claim 13, wherein adjusting the multi-element antenna to the higher order antenna system comprises increasing a number of antenna elements that are operating for at least one of transmitting and receiving signals.

15. The system of claim 11, wherein the multi-element antenna is adjusted to the lower order antenna system and the wireless device is classified as the lower order wireless device.

16. The system of claim 15, wherein adjusting the multi-element antenna to the lower order antenna system comprises decreasing a number of antenna elements that are operating for at least one of transmitting and receiving signals.

17. The system of claim 11, wherein the processor is further configured to:
    process the mobility information to determine a mobile criteria of the wireless device, the mobile criteria being based on a change in position of the wireless device,
    compare the mobile criteria with a predetermined threshold, and
    adjust the multi-element antenna by increasing a number of operating antenna elements if the mobile criteria is equal to or greater than the predetermined threshold.

18. The system of claim 11, wherein the translational movement comprises one or more of a translational speed of the wireless device, a change in location of the wireless device, and a distance traveled by the wireless device.

19. A processing node for adjusting a multi-element antenna serving a wireless device, the processing node being configured to perform operations comprising:
- receiving mobility information from the wireless device in a wireless network, the wireless device served by an access node comprising the multi-element antenna, the multi-element antenna comprising a plurality of elements configured to establish a lower order antenna system or a higher order antenna system, and the mobility information relating to a translational movement of the wireless device;
- processing the mobility information to classify the wireless device as a lower order mobility device or a higher order mobility wireless device; and
- responsive to receiving the mobility information, adjusting the multi-element antenna to the lower order antenna system for the lower order mobility device or the higher order antenna system for the higher order mobility wireless device.

20. The processing node of claim 19, wherein the translational movement comprises one or more of a translational speed of the wireless device, a change in location of the wireless device, and a distance traveled by the wireless device.

* * * * *